United States Patent
Wu et al.

(10) Patent No.: US 7,848,434 B2
(45) Date of Patent: Dec. 7, 2010

(54) CHANNEL ESTIMATOR AND RELATED METHOD FOR SMOOTHING CHANNEL RESPONSES OF A MULTI-CARRIER SYSTEM

(75) Inventors: Kuo-Ming Wu, Nan-Tou Hsien (TW); Der-Zheng Liu, Tai-Nan (TW)

(73) Assignee: Realtek Semiconductor Corp., Hsinchu (TW)

( * ) Notice: Subject to any disclaimer, the term of this patent is extended or adjusted under 35 U.S.C. 154(b) by 1024 days.

(21) Appl. No.: 11/161,401

(22) Filed: Aug. 2, 2005

(65) Prior Publication Data

US 2006/0039488 A1 Feb. 23, 2006

(30) Foreign Application Priority Data

Aug. 23, 2004 (TW) .............................. 93125353 A

(51) Int. Cl.
*H04K 1/10* (2006.01)
(52) U.S. Cl. ..................... 375/260; 375/232; 375/234; 375/239; 375/316; 375/340; 370/206; 370/252; 370/526; 370/209; 370/210
(58) Field of Classification Search ................ 375/260, 375/232, 234, 239, 316, 340; 370/206, 252, 370/526, 209, 210
See application file for complete search history.

(56) References Cited

U.S. PATENT DOCUMENTS

| | | | |
|---|---|---|---|
| 7,359,311 B1* | 4/2008 | Paranjpe et al. | 370/203 |
| 2002/0065047 A1* | 5/2002 | Moose | 455/63 |
| 2002/0110138 A1* | 8/2002 | Schramm | 370/430 |
| 2003/0128656 A1* | 7/2003 | Scarpa | 370/203 |
| 2003/0185314 A1* | 10/2003 | Kolze | 375/316 |
| 2003/0211851 A1* | 11/2003 | Moon et al. | 455/450 |
| 2004/0037262 A1* | 2/2004 | Tanada | 370/342 |
| 2004/0218519 A1* | 11/2004 | Chiou et al. | 370/203 |
| 2005/0031028 A1* | 2/2005 | Chiu | 375/224 |
| 2005/0105461 A1* | 5/2005 | Mitsugi | 370/208 |
| 2005/0141657 A1* | 6/2005 | Maltsev et al. | 375/346 |
| 2005/0243899 A1* | 11/2005 | Bilgic et al. | 375/148 |
| 2005/0265466 A1* | 12/2005 | Wang | 375/260 |

* cited by examiner

*Primary Examiner*—David C Payne
*Assistant Examiner*—Zewdu Kassa
(74) *Attorney, Agent, or Firm*—Thomas, Kayden, Horstemeyer & Risley, LLP

(57) ABSTRACT

A channel estimator and a related method for smoothing channel responses of a multi-carrier system. The channel estimator includes a channel response computing circuit for computing at least one of a target channel estimation and a reference channel estimation by utilizing a computing algorithm, wherein the target channel estimation and the reference channel estimation corresponds to a sub-carrier channel respectively.

16 Claims, 2 Drawing Sheets

CHANNEL ESTIMATOR AND RELATED METHOD FOR SMOOTHING CHANNEL RESPONSES OF A MULTI-CARRIER SYSTEM

BACKGROUND OF THE INVENTION

1. Field of the Invention

The present invention relates to a channel estimator and related method, and more particularly, to a channel estimator and related method for smoothing a channel response of a multi-carrier communication system.

2. Description of the Prior Art

The communication channel between a receiver and a transmitter delays and attenuates the transmitted signal. As a result, the amplitude of a received signal is smaller than the amplitude of the corresponding transmitted signal, and the phase of the transmitted signal is different from the phase of the received signal. To alleviate the phenomenon mentioned above, an equalizer and a channel estimator are implemented in the receiver to restore the attenuated and delayed signal received from the communication channel. Firstly, the channel estimator evaluates the attenuation and the delay of the received signal according to a preamble of the received packet, where the preamble is a series of known symbols. That is, the channel estimator generates a channel estimating value by comparing the received signal with the known symbols. The operation of the channel estimator is shown in the following equation:

$$H' = \frac{R}{X} \qquad \text{Equation (1)}$$

In the equation (1), R denotes the received signal, X denotes the known preamble, and H' denotes the channel estimating value.

After a plurality of channel estimating values H', H", . . . ,H'$^{(n)}$ corresponding to the same sub-channel are generated then a channel response $\hat{H}$ of the communication channel is produced by computing a mean value of the plurality of channel estimating values H', H", . . . H'$^{(n)}$. Please note that, H' denotes a channel estimating value produced by utilizing a first symbol of the preamble, and the channel estimating value H" denotes a channel estimating value produced by utilizing a second symbol of the preamble. The first symbol and the second symbols correspond to a first time interval and a second time interval, respectively. In the same manner, H'$^{(n)}$ denotes a channel estimating value produced by utilizing an n-th symbol of the preamble corresponding to an n-th time interval. Because of noise, the channel estimating values generated in different time intervals correspond to different values. Finally, the equalizer utilizes an inverse function of the channel response $\hat{H}$ to restore the received signal R thereby generating an equalized signal. The equalized signal is no longer distorted by the communication channel and is considerably equal to the original transmitted signal.

In the multi-carrier communication system, such as an ultra-wideband (UWB) communication system, the channel responses of two adjacent sub-carriers are correlated such that the channel responses of different sub-carriers will form a smoothed curve in a spectrum. Unfortunately, the wireless communication system suffers from noise. The noise reduces the signal to noise ratio (SNR) of the wireless communication system. Owing to the noise of the communication channel, the estimated channel responses are incorrect. The resulting curve containing the incorrect channel responses displays jitters. Furthermore, it is not possible to utilize these incorrect channel responses in an effort to restore the received signal in hopes of generating the equalized signal.

SUMMARY OF THE INVENTION

It is therefore an objective of the claimed invention to provide a channel estimator and related method capable of smoothing a channel response of a multi-carrier communication system in order to solve the above-mentioned problem.

According to an embodiment of the claimed invention, a channel estimator for evaluating a channel response of a sub-carrier in a multi-carrier communication system is disclosed. The channel estimator comprises: a channel response computing circuit for processing one of a target channel estimating value and a reference channel estimating value according to an computing algorithm to generate a smoothed target channel response, wherein the target channel estimating value and the reference channel estimating value correspond to a sub-carrier channels in the multi-carrier communication system, respectively.

According to an embodiment of the claimed invention, a channel response smoothing method for smoothing a channel response of a sub-carrier in a multi-carrier communication system is disclosed. The channel estimating method comprises: utilizing a computing algorithm to process one of a target channel estimating value and a reference channel estimating value to generate a computing result, wherein the target channel estimating value and the reference channel estimating value corresponding to a first sub-carrier channel and a second sub-carrier channel of the multi-carrier communication system, respectively; and processing the target channel estimating value according to the computing result to generate a smoothed target channel response.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
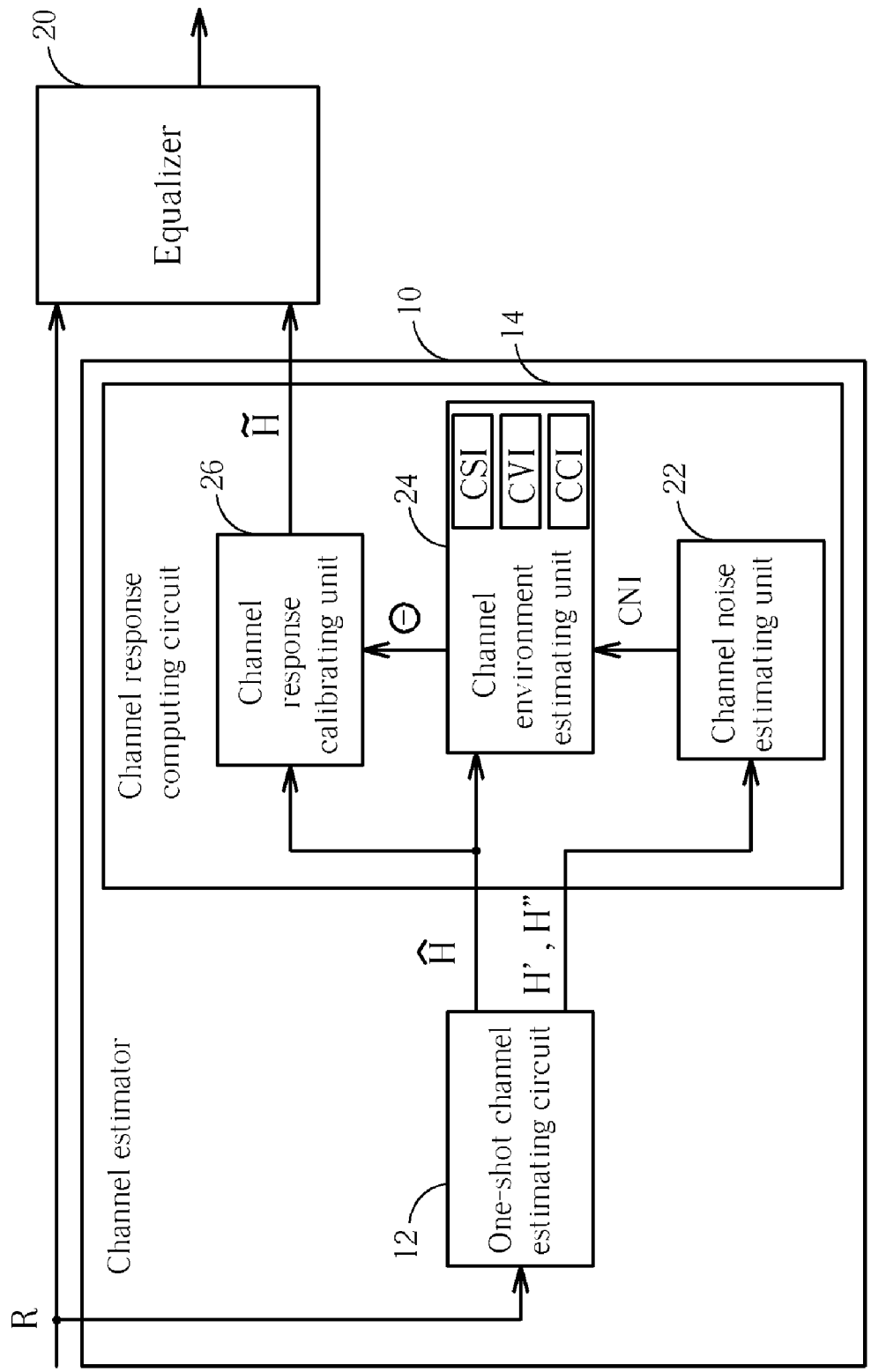
FIG. 1 is a functional block diagram of the channel estimator according to a preferred embodiment of the present invention.

Please refer to FIG. 1. FIG. 1 is a functional block diagram of the channel estimator 10 according to a preferred embodiment of the present invention. As shown in FIG. 1, the channel estimator 10 is implemented in a multi-carrier communication system, such as a UWB (Ultra-wideband) communication system. The channel estimator 10 comprises a one-shot channel estimating circuit 12 and a channel response computing circuit 14. Firstly, in the preferred embodiment, the one-shot channel estimating circuit 12 evaluates a plurality of one-shot channel estimating values H according to a plurality of preamble symbols of received packets. Secondly, the one-shot channel estimating circuit 12 computes a channel estimating value $\hat{H}$ according to the plurality of one-shot channel estimating values H. The channel estimating value $\hat{H}$ is a mean value or a functional value of the plurality of one-shot channel estimating value H. Finally, the channel response computing circuit 14 adjusts the channel estimating value $\hat{H}$ outputted by the one-shot channel estimating circuit 12. In this embodiment, the one-shot channel estimating circuit 12 firstly generates two one-shot channel estimating values $H_{j,k}'$ and $H_{j,k}''$ according to the received signal R, wherein j denotes the index of band and k denotes the index of sub-carrier of the multi-carrier communication system. The one-shot channel estimating value $H_{j,k}'$ is generated according to k-th sub-carrier in a first time interval and the one-shot channel estimating value $H_{j,k}''$ is generated according to k-th sub-carrier in a second time interval. Secondly, the one-shot channel estimating circuit 12 generates a mean value of the one-shot channel estimating value $H_{j,k}'$ and $H_{j,k}''$ as a channel estimating value $\hat{H}_{j,k}$. Finally, the channel response computing circuit 14 generates a smoothed channel response $\tilde{H}_{j,k}$ by adjusting the channel estimating value $\hat{H}_{j,k}$, and then outputting the smoothed channel response $\tilde{H}_{j,k}$ to the equalizer 20.

In the preferred embodiment, the channel response computing circuit 14 includes a channel noise estimating unit 22, a channel environment estimating unit 24, and a channel response calibrating unit 26 as shown in FIG. 1. The channel noise estimating unit 22 generates a channel noise indicator $CNI_{j,k}$ by utilizing a difference between the one-shot channel estimating values $H_{j,k}'$ and $H_{j,k}''$. $CNI_{j,k}$ denotes the signal to noise ratio. The operation of generating the channel noise indicator CNI is shown in the following equation:

$$CNI_{j,k} = \begin{cases} 1, \|H'_{j,k}| - |H''_{j,k}\| \geq \gamma_{cni} \\ 0, \text{otherwise} \end{cases} \quad \text{Equation (2)}$$

If the difference between the channel estimating value $H_{j,k}'$ and $H_{j,k}''$ is greater than a threshold value $\gamma_{cni}$, then the channel noise estimating unit 22 determines that the noise of the communication channel exceeds a tolerant range. In this case the channel noise estimating unit 22 sets the channel noise indicator CNI be equal to logic "1". Consequently, the channel response computing circuit 14 utilizes the channel estimating value $\hat{H}_{j,k}$ to obtain the smoothed channel response $\tilde{H}_{j,k}$. If the outputted channel noise indicator CNI is equal to logic "0", then the channel response computing circuit 14 will not process the channel estimating value $\hat{H}_{j,k}$. The manner of generating the channel estimating value $\hat{H}_{j,k}$ are shown in the following paragraphs.

Please keep referring to FIG. 1. When the one-shot channel estimating circuit 12 outputs the channel estimating value $\hat{H}_{j,k}$, the channel environment estimating unit 24 generates a set of smoothing filtering coefficients $\Theta_{j,k}$ according to the channel estimating value $\hat{H}_{j,k}$ and at least one adjacent channel estimating value $\hat{H}_{j,k-1}$. The channel response calibrating unit 26 is capable of calibrating the channel estimating value $\hat{H}_{j,k}$ according to the set of smoothing filtering coefficients $\Theta_{j,k}$. Please note that, the channel estimating value $\hat{H}_{j,k}$ and $\hat{H}_{j,k-1}$ are called a target channel estimating value $\hat{H}_{j,k}$ and a reference channel estimating value $\hat{H}_{j,k-1}$.

In the preferred embodiment, the channel environment estimating unit 24 utilizes the target channel estimating value $\hat{H}_{j,k}$ and the reference channel estimating value $\hat{H}_{j,k-1}$ to computes a channel varying indicator CVI. The operation of computing the channel varying indicator $CVI_{j,k}$ are shown in the following equation according to the preferred embodiment:

$$CVI_{j,k} = \begin{cases} 1, \||\hat{H}_{j,k}| - |\hat{H}_{j,k-1}|\| < \gamma_{cvi,L} \\ 2, \gamma_{cvi,L} < \||\hat{H}_{j,k}| - |\hat{H}_{j,k-1}|\| < \gamma_{cvi,H} \\ 3, \||\hat{H}_{j,k}| - |\hat{H}_{j,k-1}|\| \geq \gamma_{cvi,H} \end{cases} \quad \text{Equation (3)}$$

In addition to generating the channel noise indicator $CNI_{j,k}$ and the channel varying indicator $CVI_{j,k}$, the channel environment estimating unit 24 also generates a channel strength indicator CSI corresponding to the magnitude of the target channel estimating value $\hat{H}_{j,k}$ according to the present embodiment. The operation of generating the channel strength indicator $CSI_{j,k}$ are shown in the following equation:

$$CSI_{j,k} = \begin{cases} 1, |\hat{H}_{j,k}| \geq \gamma_{csi,H} \\ 2, \gamma_{csi,L} < |\hat{H}_{j,k}| < \gamma_{csi,H} \\ 3, |\hat{H}_{j,k}| < \gamma_{csi,L} \end{cases} \quad \text{Equation (4)}$$

In the equation (3) and equation (4), $\gamma_{cvi,L}$, $\gamma_{cvi,H}$, $\gamma_{csi,L}$, and $\gamma_{csi,H}$ denote the lower threshold of the channel varying indicator CVI, the higher threshold of the channel varying indicator CVI, the lower threshold of the channel strength indicator CSI, and the higher threshold of the channel strength indicator CSI, respectively. Please note that the number of the thresholds, which are utilized to divide the channel varying indicator CVI or the channel strength indicator CSI into several levels, are not limited to the preferred embodiment. As a result, any method capable of indicating the difference between the target channel estimating value $\hat{H}_{j,k}$ and the reference channel estimating value $\hat{H}_{j,k-1}$, such as squaring the difference, can also be applied in the present invention to generate the channel varying indicator CVI. In addition, another method capable of presenting the magnitude of the target channel estimating value $\hat{H}_{j,k}$ can also be utilized to generate the channel strength indicator CSI.

In the preferred embodiment, the channel environment estimating unit 24 utilizes the channel varying indicator CVI and the channel strength indicator CSI to generate a channel condition indicator CCI. The operation of generating the channel condition indicator $CCI_{j,k}$ is shown in the following equation:

$$CCI_{j,k} = CSI_{j,k} \cdot CVI_{j,k} \quad \text{Equation (5)}$$

Please note that the method for generating the channel condition indicator $CCI_{j,k}$ are not limited to multiplying the channel varying indicator $CVI_{j,k}$ and the channel strength indicator $CSI_{j,k}$. Moreover, the channel environment estimating unit 24 utilizes the channel condition indicator CCI to select a set of smoothing filtering coefficients $\Theta$ according to the following equation:

$$\Theta_{j,k} = \begin{cases} \Theta_1, CCI < \gamma_{cci,L} \\ \Theta_2, \gamma_{cci,L} \leq CCI < \gamma_{cci,H} \\ \Theta_3, CCI \geq \gamma_{cci,H} \end{cases} \quad \text{Equation (6)}$$

In addition to generating the channel noise indicator $CNI_{j,k}$ and the channel varying indicator $CVI_{j,k}$, the channel environment estimating unit 24 also generates a channel strength indicator CSI corresponding to the magnitude of the target channel estimating value $\hat{H}_{j,k}$ according to the present embodiment. The operation of generating the channel strength indicator $CSI_{j,k}$ are shown in the following equation:

$$\tilde{H}_{j,k} = \Theta_{j,k} \cdot [\tilde{H}_{j,k-1} \tilde{H}_{j,k} \tilde{H}_{j,k+1}] \quad \text{Equation (7)}$$

In equation (7) $\tilde{H}_{j,k}$ denotes the smoothed target channel response. If $\Theta_3$ is selected to be the set of smoothing filtering coefficients $\Theta_{j,k}$, the smoothed target channel response $\tilde{H}_{j,k}$ is equal to the target channel estimating value $\hat{H}_{j,k}$. If $\Theta_1$ is selected to be the set of smoothing filtering coefficients $\Theta_{j,k}$, then the target channel estimating value $\hat{H}_{j,k}$ is significantly calibrated and this calibration will be most apparent. If $\Theta_2$ is selected to be the set of smoothing filtering coefficients $\Theta_{j,k}$, then the target channel estimating value $\tilde{H}_{j,k}$ is gently (i.e. to a much less degree) calibrated.

Please note that the functional diagram shown in FIG. 1 is a preferred embodiment of the present invention. As a result, the channel response computing circuit can be implemented in numerous ways according to the present invention, for utilizing the target channel estimating value and the reference channel estimating value to compute a smoothed target channel response.

Figure 2:
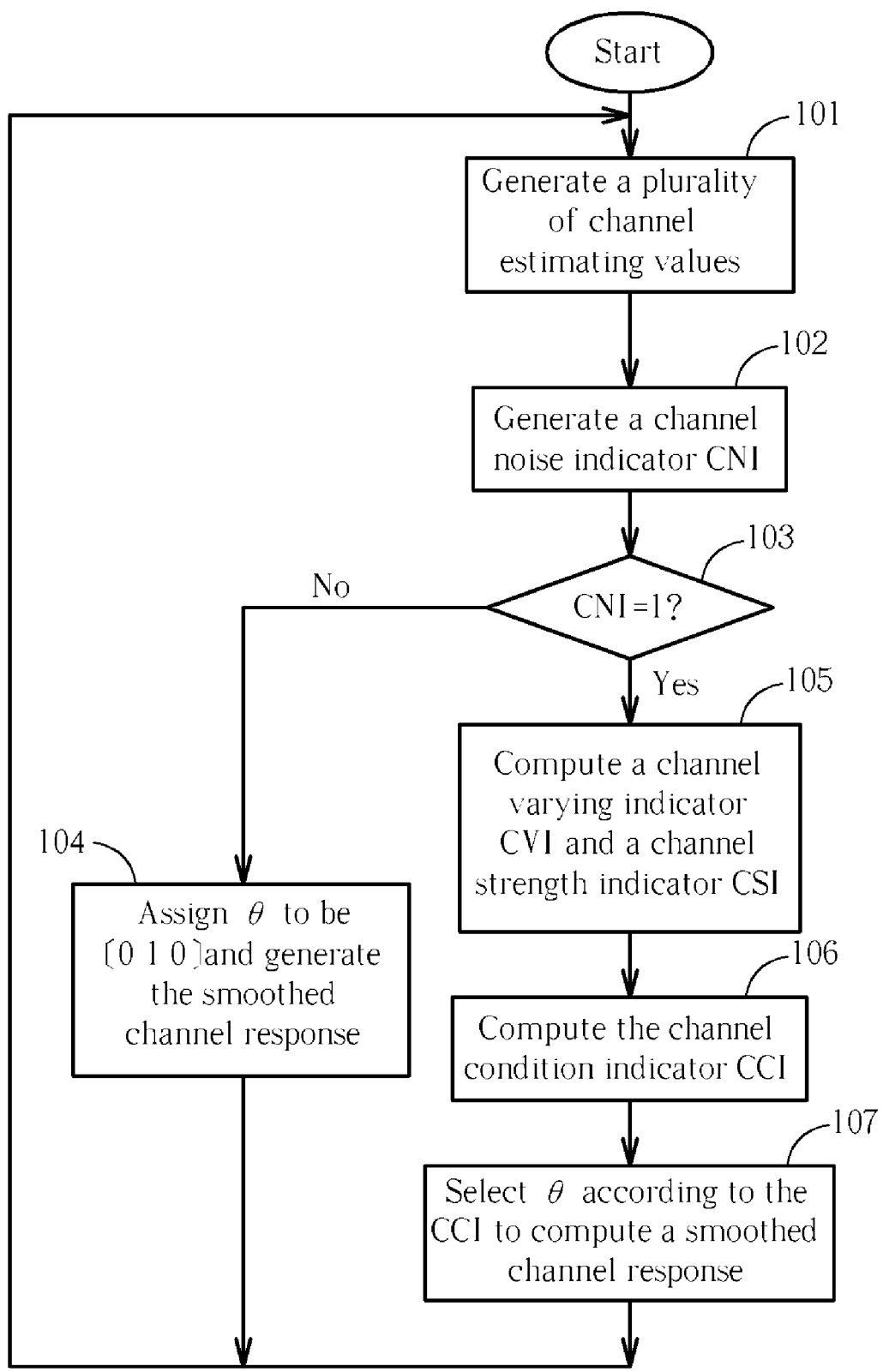
FIG. 2 is a flow chart of the channel response smoothing method according to a preferred embodiment.

Please refer to FIG. 2. FIG. 2 is a flow chart of the channel response smoothing method according to a preferred embodiment. The channel response smoothing method comprises the following steps:

Step 101: proceed with a channel estimation procedure according to preamble symbols of received packets to generate a plurality of one-shot channel estimating values and the corresponding channel estimating values, wherein the one-shot channel estimating values comprise a plurality of one-shot target channel estimating values and a plurality of one-shot reference channel estimating values, and the channel estimating values comprises a target channel estimating value and a reference channel estimating value.

Step 102: Compare at least two one-shot target channel estimating values according to a computing algorithm to generate a channel noise indicator CNI.

Step 103: If the channel noise relating to the channel noise indicator CNI exceeds a tolerant range, proceed to step 105, otherwise proceed to step 104.

Step 104: assign the set of smoothing filtering coefficients Θ to be [0 1 0] in order to generate the smoothed channel response equal to the target channel estimating value, and return to Step 101.

Step 105: compute a channel varying indicator CVI and a channel strength indicator CSI according to equation (3) and equation (4).

Step 106: compute the channel condition indicator CCI according to equation (5).

Step 107: select a set of smoothing filtering coefficients Θ according to the channel condition indicator CCI then utilize the channel estimating values and the set of smoothing filtering coefficients Θ to compute a smoothed channel response according equation (7), then return to Step 101.

Please note the following two items regarding the computing algorithm mentioned above. First, the computing algorithm may comprise a plurality of equations. Second, the forms of the equations are not limited.

As shown in FIG. 2, if the difference between two one-shot channel estimating values of a sub-carrier does not exceed a tolerant range then the signal to noise ratio is high enough to assign any one-shot channel estimating value to be the smoothed channel response. As a result, the set of smoothing filtering coefficients Θ adopted by the channel response calibrating unit 26 are [0 1 0]. If the difference between two one-shot channel estimating values of a sub-carrier exceeds a tolerant range then the signal to noise ratio is too low. As a result, the channel estimating values are processed to generate the smoothed channel response. In other words, the set of smoothing filtering coefficients Θ are chosen according to the channel condition indicator CCI, in order to select a set of smoothing filtering coefficients Θ to generate the smoothed channel response.

In summary, the channel estimator compares more than one one-shot channel estimating values to evaluate the channel noise. Besides, the channel estimator processes the channel estimating values corresponding to different sub-channels, respectively, to generate a more precise smoothed channel response. As a result, the ability to alleviate the noise of the communication system rises at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A channel estimator for evaluating a channel response of a sub-carrier in a multi-carrier communication system, the channel estimator comprising:
   a channel response computing circuit for processing both a target channel estimating value and a reference channel estimating value according to a computing algorithm to generate a smoothed target channel response by generating a channel condition indicator, wherein the target channel estimating value and the reference channel estimating value respectively correspond to sub-carrier channels in the multi-carrier communication system; and
   the channel condition indicator being generated based on multiplying a channel strength indicator corresponding to the magnitude of the target channel estimating value and a channel varying indicator utilizing the target channel estimating value and the reference channel estimating value.

2. The channel estimator of claim 1 further comprising:
   a one-shot channel estimating circuit, electrically connected to the channel response computing circuit, for generating a plurality of one-shot target channel estimating values according to different time intervals and a plurality of one-shot reference channel estimating values according to different time intervals, the one-shot channel estimating circuit or the channel response computing circuit generating the target channel estimating value and the reference channel estimating value according to the one-shot target channel estimating values and the one-shot reference channel estimating values, respectively.

3. The channel estimator of claim 1 further comprising:
   a one-shot channel estimating circuit, electrically connected to the channel response computing circuit, for generating at least two one-shot target channel estimating values according to different time intervals, and the channel response computing circuit generating a channel noise indicator by processing the one-shot target channel estimating values according to the computing algorithm, then the channel response computing circuit generating the smoothed target channel response by processing the target channel estimating value according to the channel noise indicator.

4. The channel estimator of claim 3, wherein the channel response computing circuit compares the difference between the one-shot target channel estimating values with a threshold value according to the computing algorithm to generate the channel noise indicator, and when the channel noise indicator indicating the difference between the one-shot target channel estimating values is greater than the threshold value, the smoothed target channel response is equal to the target channel estimating value, otherwise the channel response computing circuit generates the smoothed target channel response by processing the target channel estimating value or the reference channel estimating value according to the computing algorithm.

5. The channel estimator of claim 1, wherein the channel response computing circuit compares the target channel estimating value with at least one threshold value according to the computing algorithm to generate the channel strength indicator.

6. The channel estimator of claim 1, wherein the target channel estimating value and the reference channel estimating value correspond to two adjacent sub-carrier channels.

7. The channel estimator of claim 1, wherein the channel response computing circuit compares the difference between the target channel estimating value and the reference channel estimating value with at least one threshold value according to the computing algorithm to generate the channel varying indicator.

8. The channel estimator of claim 1, wherein the channel response computing circuit processes the target channel estimating value and the reference channel estimating value according to the computing algorithm to generate a channel strength indicator and a channel varying indicator, generates a channel condition indicator utilizing the channel strength indicator and the channel varying indicator, then generates the smoothed target channel response by processing the target channel estimating value according to the channel condition indicator.

9. The channel estimator of claim 8, wherein the channel response computing circuit compares the channel condition indicator with at least one threshold value to generate a set of smoothing filtering coefficients, and processes the target channel estimating value according to the set of smoothing filtering coefficients to generate the smoothed target channel response.

10. A channel response smoothing method for smoothing a channel response of a sub-carrier in a multi-carrier communication system, the channel estimating method comprising:
    utilizing a computing algorithm to process both a target channel estimating value and a reference channel estimating value in order to generate a computing result, wherein the target channel estimating value and the reference channel estimating value correspond to a first sub-carrier channel and a second sub-carrier channel of the multi-carrier communication system, respectively, wherein utilizing comprises multiplying a channel strength indicator and a channel varying indicator according to the computing algorithm to generate the computing result, the computing result corresponding to a channel condition indicator; wherein the channel strength indicator corresponds to the magnitude of the target channel estimating value and the channel varying indicator utilizes the target channel estimating value and the reference channel estimating value; and
    processing the target channel estimating value according to the computing result to generate a smoothed target channel response.

11. The channel response smoothing method of claim 10, wherein the step of utilizing the computing algorithm comprises:
    receiving a plurality of one-shot target channel estimating values and a plurality of one-shot reference channel estimating values, the one-shot target and reference channel estimating values being generated according to different time intervals; and
    generating the target channel estimating value and the reference channel estimating value by respectively processing the one-shot target channel estimating values and the one-shot reference channel estimating values according to the computing algorithm.

12. The channel response smoothing method of claim 10, wherein the step of utilizing the computing algorithm further comprises:
    receiving at least two one-shot target channel estimating values being generated according to different time intervals, each one-shot target channel estimating value and the target channel estimating value corresponding to the first sub-carrier channel, each one-shot reference channel estimating value and the reference channel estimating value corresponding to the second sub-carrier channel; and
    comparing a difference between the one-shot target channel estimating values with a threshold value according to the computing algorithm to generate the computing result, the computing result corresponding to a channel noise indicator.

13. The channel response smoothing method of claim 12, wherein when the channel noise indicator indicates the difference between the one-shot target channel estimating values greater than the threshold value, the smoothed target channel response is equal to the target channel estimating value, otherwise the target channel estimating value or the reference channel estimating value are processed according to the computing algorithm to generate the smoothed target channel response.

14. The channel response smoothing method of claim 10, wherein the step of utilizing the computing algorithm comprises:
    comparing a difference between the target channel estimating value and the reference channel estimating value with at least one threshold value according to the computing algorithm to generate the computing result, the computing result corresponding to a channel varying indicator.

15. The channel response smoothing method of claim 10 further comprising:
    processing the channel strength indicator and the channel varying indicator according to the computing algorithm to generate a channel condition indicator; and
    comparing the channel condition indicator with at least one threshold value according to the computing algorithm to generate the computing result, the computing result corresponding to a set of smoothing filtering coefficients.

16. A channel estimator comprising:
    a channel response computing circuit for smoothing a channel response of a sub-carrier in a multi-carrier communication system, the channel response computing circuit processing both a target channel estimating value and a reference channel estimating value according to a computing algorithm,
    wherein the target channel estimating value and the reference channel estimating value correspond to two different sub-carrier channels respectively of the multi-carrier communication system,
    the channel response computing circuit further comprising a channel response calibrating unit for calibrating the target channel estimating value to generate a smoothed target channel response according to smoothing filter coefficients selected based on a channel condition indicator,
    wherein the channel condition indicator is based on multiplication of a channel strength indicator that corresponds to the magnitude of the target channel estimating value and a channel varying indicator that utilizes the target channel estimating value and the reference channel estimating value.

* * * * *